Figure 5:
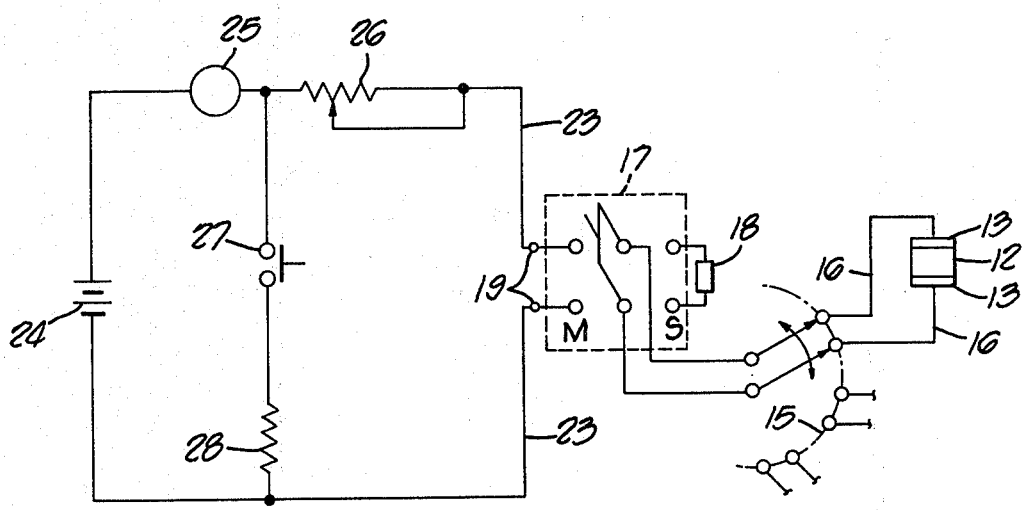

United States Patent [19]

Matlin

[11] 3,882,383
[45] May 6, 1975

[54] SOIL MOISTURE SENSING SYSTEM
[76] Inventor: Charles Matlin, 5552 Lanto St., Bell Gardens, Calif. 90201
[22] Filed: June 7, 1973
[21] Appl. No.: 367,872

[52] U.S. Cl. .............. 324/65 R; 324/65 P; 340/235
[51] Int. Cl. ............................................ G01r 27/02
[58] Field of Search ................ 324/65 P, 65 R, 132; 340/235; 73/73; 200/61.05

[56] References Cited
UNITED STATES PATENTS

| | | | |
|---|---|---|---|
| 1,610,563 | 12/1926 | McIlvaine........................... | 324/65 P |
| 2,171,670 | 9/1939 | Parker ............................. | 324/132 X |
| 2,611,643 | 9/1952 | Higgins ............................ | 340/235 X |
| 2,782,364 | 2/1957 | Shuler, Jr. et al. ................ | 324/64 X |
| 2,870,404 | 1/1959 | Oxley ............................... | 324/65 P |
| 3,207,981 | 9/1965 | Marsh et al. ....................... | 324/65 P |
| 3,426,341 | 2/1969 | Hallwood .......................... | 324/65 P |
| 3,548,304 | 12/1970 | Lohnes............................. | 324/65 R |
| 3,689,832 | 9/1972 | Leto et al.......................... | 324/65 R |

FOREIGN PATENTS OR APPLICATIONS

| | | | |
|---|---|---|---|
| 808,682 | 7/1951 | Germany........................... | 324/65 P |
| 503,368 | 7/1930 | Germany........................... | 324/65 P |

*Primary Examiner*—Stanley T. Krawczewicz

[57] ABSTRACT

This invention relates to an electrical resistivity method for testing the moisture content of soil. The electrical resistivity of the soil is sensed by a novel soil moisture sensor having two electrodes in direct contact with the soil under test. This combination of sensor and associated soil become a variable resistive component of an electronic network; whose output is used to energize either a meter for quantitative measurements or a miniature lite bulb for qualitative monitoring. The soil moisture sensor features a floating/breathing electrode to compensate for the adverse effects of unpredictable variations in contact pressure between the sensor electrodes and associated soil. The electrical circuitry features: a means for de-polarizing sensor electrodes, a means for assuring against electrical ground loops, a novel solid state circuit for translating soil moisture into the light intensity of a miniature lite bulb.

2 Claims, 9 Drawing Figures

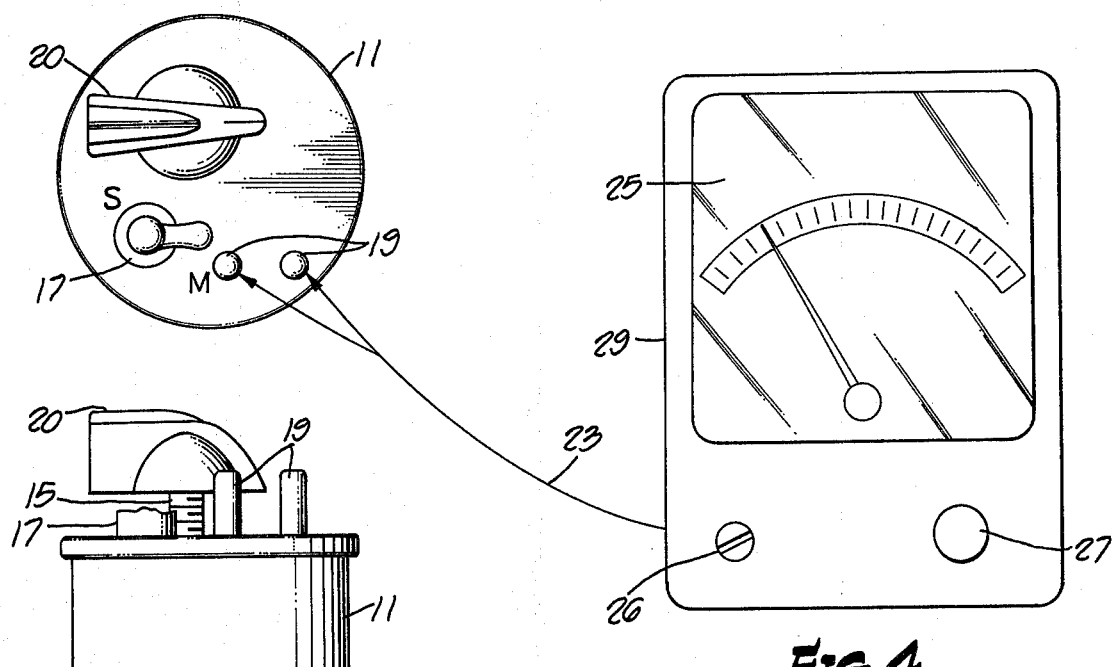
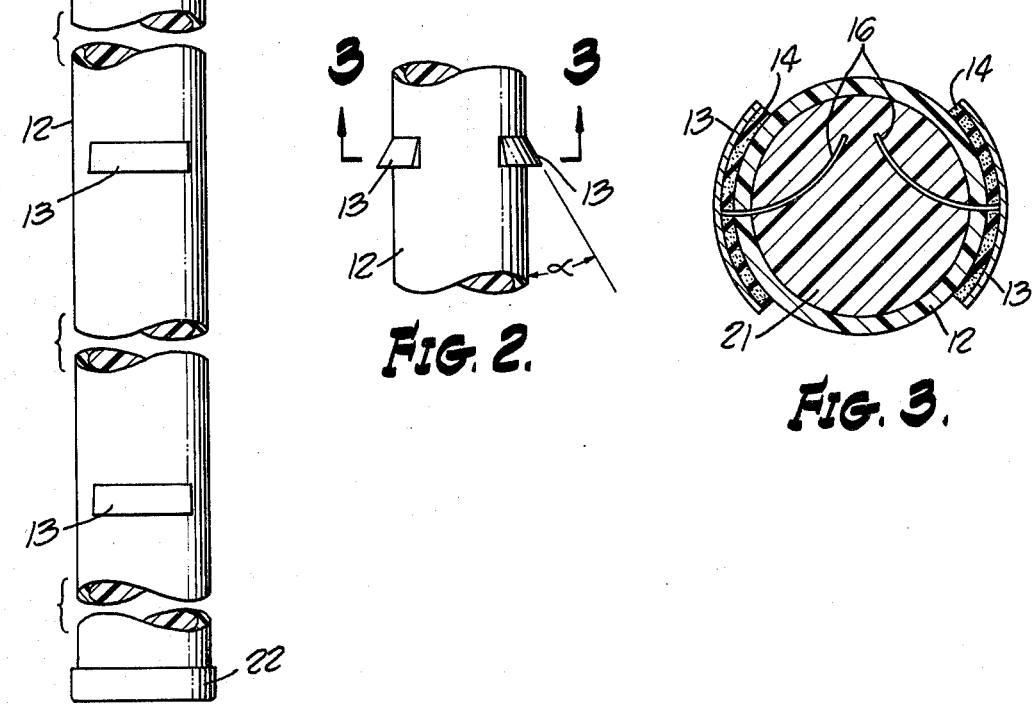
FIG. 1.
FIG. 2.
FIG. 3.
FIG. 4.

SOIL MOISTURE SENSING SYSTEM

CROSS REFERENCES TO RELATED APPLICATION

1. Disclosure Document; No. 005561, June 11, 1971
2. U.S. Pat. No. 2,793,527; Soil Moisture Testing Apparatus, May 18, 28,
3. U.S. Pat. No. 2,985,827; Moisture Sensing Means, May 23, 1961
4. U.S. Pat. No. 3,146,617; Moisture Measuring System, Sept. 1, 1964

This invention relates to an improved electrical resistivity method for measuring and or monitoring the moisture in soil and more particularly to systems using improved instrumentation, encompassing: a soil moisture sensor, electrical circuitry and designs adapable to mass production/automation techniques.

The electrical resistivity of soil is primarily a function of soil density, salinity and moisture content. At any one location, moisture content is the variable of major concern. The resistivity, maximum when the soil is dry, decreases as soil moisture increases until saturation is achieved. Electrical energy, when applied to metallic conductors embedded in the soil, causes an electrical current to flow between the conductors, the amplitude of said current being directly proportional to the soil moisture; minimum current flow in dry soil, maximum current flow in saturated soil. This invention uses a soil moisture sensor consisting, in part, of two metallic conductors electrically separated by insulating material. The external part of the electrodes are in direct contact with the soil under test. Therefore, this soil combines with the soil moisture sensor to become a resistive component of an electrical circuit. The application of electrical energy to this circuit results in a current flow which is translated into either a meter reading or a light intensity of a lite bulb.

In the early state of the art, the major stumbling blocks to the use of electrodes in direct contact with the soil being tested have been erratic results caused by polarization and varying contact resistance. Polarization, caused by the formation of gas or other chemical products on the electrodes, depends primarily on soil salinity, current magnitude and electrode material. Its effect can be minimized by using alternating current. Varying contact resistance, due to contraction and expansion of soil around the electrodes, is equivalent to a soil density change. My tests show that soil pressure changes are the primary cause of soil density changes and that temperature has minor import. Changes in soil moisture content and external pressures (a person's weight, for example) are two soil pressure influencing factors. A development in the art of the electrical resistivity method of measuring soil moisture was the introduction of resistance units, or cells, using materials such as nylon, fiber glass, plaster of paris or combinations of them to enclose the electrodes. This indirect method for soil moisture measurements introduced other variables with questionable properties and thus new problems, for example; tracking. Tracking, as defined here, is the ability of the cell to either gain or lose moisture at the same rate as that of the surrounding soil. Where there is a lagging tracking characteristic, the soil may appear to have adequate moisture whereas in reality the soil had already dried below the wilting point of its plant life. My tests, to date, have shown these cells to have poor tracking characteristics.

My invention embodies features which make it practical to use electrodes in direct contact with the soil under test. The negative effects of polarization are made inconsequential by a prudent selection of electrodes, very low current, the insuring of intermittent operation and the use of a shorting bar. Recovery from polarization results either from diffusion of the gas or by action of an oxidizing material. Therefore, direct current instead of alternating current can be used greatly simplifying and reducing the cost of the end product. Erratic results due to variations in contact resistance have been minimized by the invention of a "floating" or "breathing" electrode.

The general object of this invention is to provide an improved method for measuring and or monitoring the moisture in soil.

Another object is to provide an improved electrical resistivity method for measuring and or monitoring the moisture in soil.

An additional object is to provide an improved type of soil moisture sensor able to sense and compensate for any varying contact contact pressure between soil and sensor.

A further object is to provide electrical circuitry that will effectively depolarize sensor electrodes thus allowing the use of direct current.

Another objective of the electrical circuitry is to provide a means for eliminating electrical ground loops between a plurality of soil moisture sensors.

A further object is to provide a novel solid state electrical circuit using a miniature lite bulb as a monitoring device.

Another object is to provide two systems by which the above objectives can be achieved.

Another objective is to create a design which is easily adaptable to mass production and or to automation.

Further objectives and advantages of my invention will appear as the specification proceeds.

Two systems are herein delineated and are identified as:

1. System A — for on the spot measurements of soil moisture using a single moisture sensor or a plurality of sensors at discrete depths.
2. System B — for remote monitoring of soil moisture using a single moisture sensor or a plurality of sensors at discrete depths and at discrete locations.

The preferred form of my invention is illustrated by the accompanying drawings wherein:

1. System A

Figure 6:
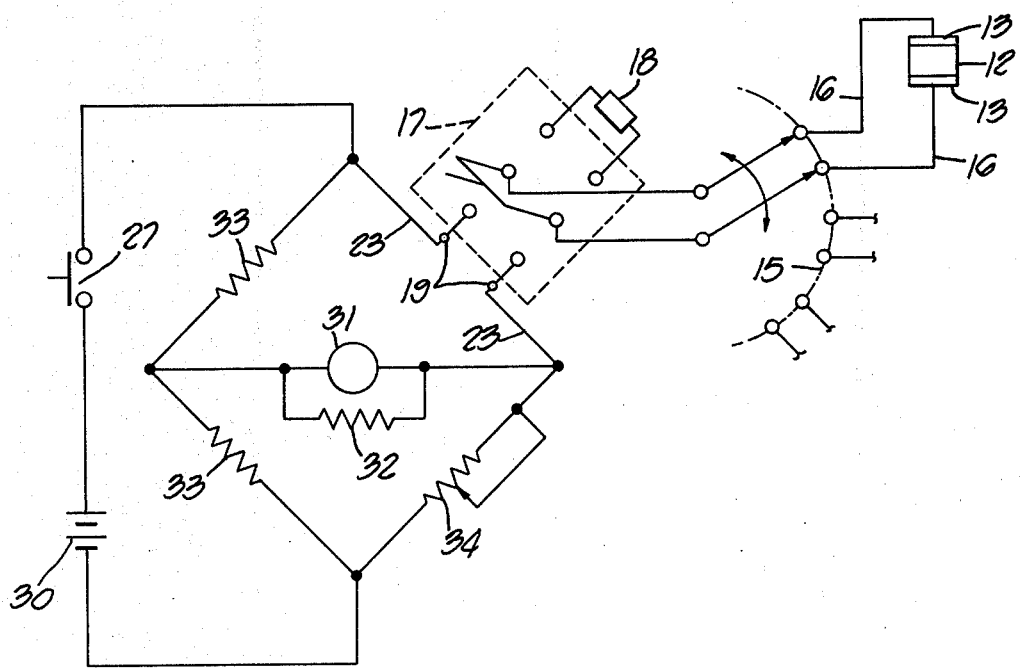

FIG. 1 is a frontal view of an embedded sensing rod.
FIG. 2 is a side view of a section of the sensing rod.
FIG. 3 is an expanded cross-sectional view of FIG. 2.
FIG. 4 is a plan view of the measuring assembly.
FIG. 5 shows the electronic circuitry for System A.
FIG. 6 shows an alternate electric circuit for System A.

2. System B

Figure 7:
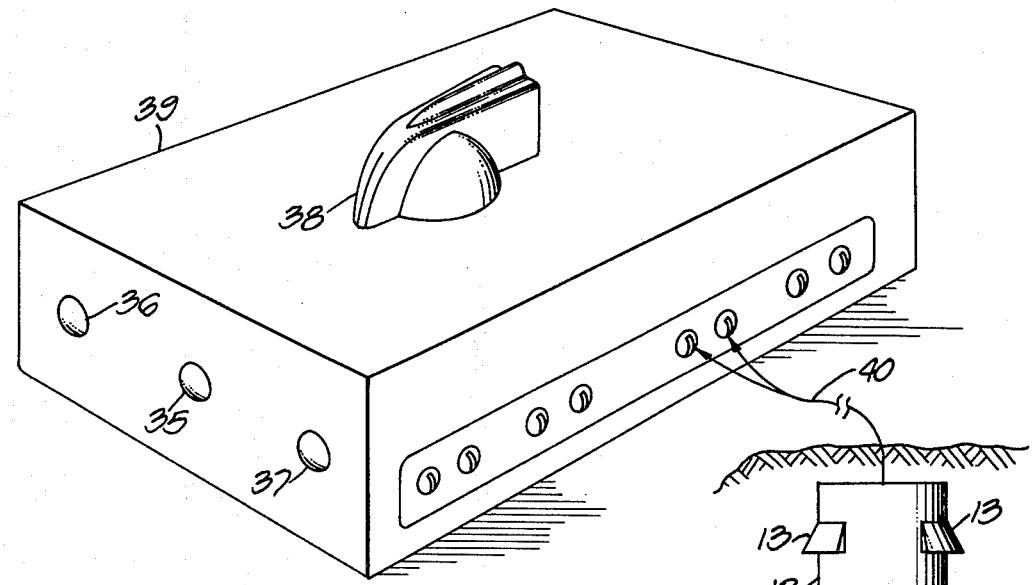
Figure 8:
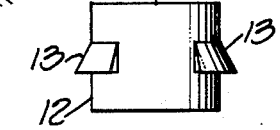
Figure 9:
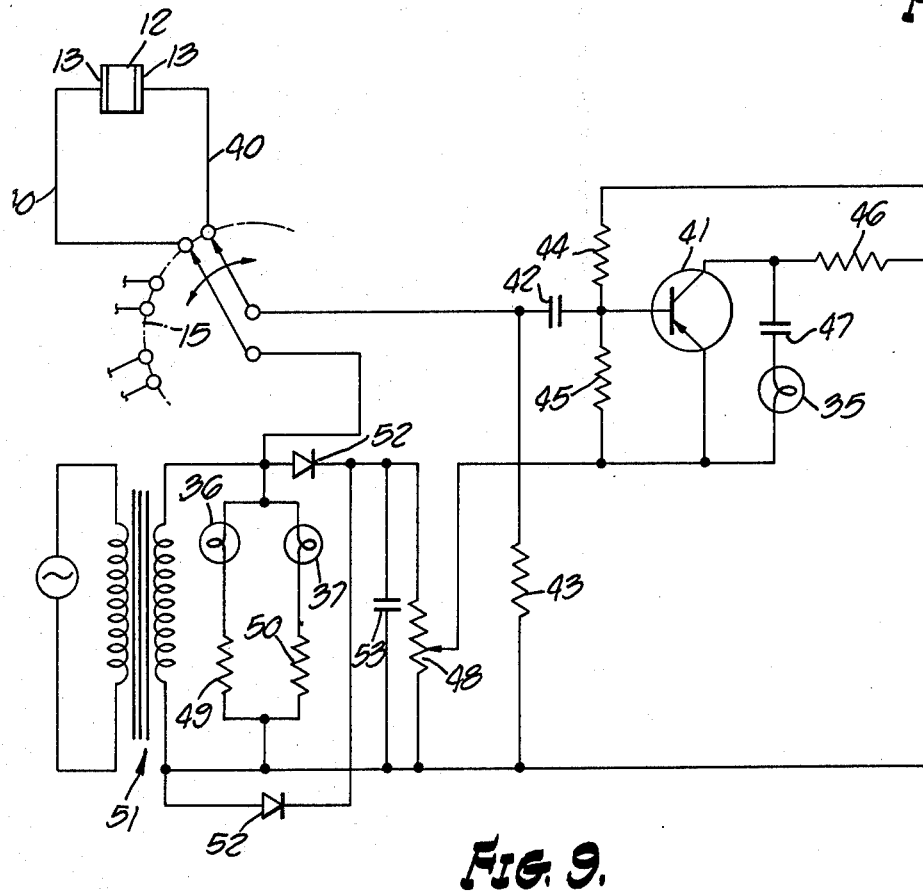

FIG. 7 is a perspective view of the monitor assembly.
FIG. 8 shows an embedded soil moisture sensor.
FIG. 9 shows the electronic circuitry for System B.

While I have shown only the preferred form of my invention, I wish to have it understood that various changes or modifications may be made within the scope of the claims hereto attached without departing from the spirit of the invention.

Referring to the drawings in detail, System A consists of a sensing rod assembly, FIG. 1, and a metering or monitoring assembly, FIG. 4. The sensing rod assembly, FIG. 1, consists of two sub-assemblies: a sensing rod 10 and a head 11.

Two components of sensing rod 10 are the rod itself 12 and the electrodes 13. Rod 12 is plastic or like tubing, typically 1 inch diameter PVC tubing of medium wall thickness. A preferred length for measuring soil moisture 3 inches and 15 inches below ground level is 30 inches. The electrodes 13 are made from thin strips of good electrical conducting, non-corrosive, metal. These electrodes 13 must have a flexible or springlike quality when made and assembled on rod 12 in the manner to be described. A preferred electrode dimension is 3/16×1×0.05 inch. The two edges of the electrode are bent and integrated into rod 12 using heat and pressure. They are embedded into the rod in such a manner that they make an angle $\alpha$ as shown in FIG. 2. A preferred $\alpha$ is 15° counter-clockwise with respect to rod 12 although further testing may decree otherwise. The resulting wedge shaped opening between the electrode and the rod is filled with a rubbery or springlike material 14 (plastic rubber or foam rubber, for example), FIG. 3. This combination of thin electrode and rubbery/springlike material forms a floating or breathing embodiment, sensitive to varying soil pressures, thus assuring the best possible contact between soil and electrode. The electrodes 13 are connected to the desired terminals of a two pole multi-position switch 15 by means of electrical wires 16. It is essential that a two pole switch be used in order to avoid electrical ground loops and so assure the electrical isolation of each sensor. This point has been missed in prior like inventions. The common terminals of switch 15 are wired to the common terminals of a two pole, two throw switch 17. One terminal pair of switch 17 is shorted using a thick copper wire or shorting bar 18. The other terminal pair of switch 17 is connected to terminal posts 19. Knob 20 controls the positioning of switch 15. Wax 21, FIG. 3, or like substance (must be good electrical insulator) is used to fill rod 12, making it impervious to moisture. Head 11 is hard plastic into which is embedded the top end of rod 12, switch 15, switch 17, the common insulating bottom of terminal posts 19 and all the associated wiring. The sensing rod assembly is then completed by cementing cap 22 to the bottom of the rod.

The meter assembly, FIG. 4, is the measuring device for System A. FIG. 5 shows the associated electrical circuitry. Cable 23, comprised of two wires terminating in a suitable clamp, is the connecting link between the sensing rod and meter assemblies. Battery 24, FIG. 5, is the energy source, typically a 9 volt transistor type. Meter 25, either a microammeter or a milliammeter, may be calibrated as a % Water Ratio. Potentiometer 26 is adjustable to the desired scale range. The network comprised of normally-off switch 27 and resistor 28 is used to check the battery. Battery limits are scribed on the face of the meter. The meter indicator must lie within these limits when switch 27 is depressed. The housing 29 for the meter assembly is typically a plastic or like material box.

An alternate electrical circuit for System A is the Wheatstone Bridge circuit shown in FIG. 6. This null type circuit has greater sensitivity than the circuit of FIG. 5. Several advantages are:

1. longer battery life since very little energy is used.
2. greater flexibility in designing calibration scales since the meter is used only for nulling/zeroing.

The energy source is any low voltage battery 30. The meter 31 is a galvanometer (zero center). It is shunted with resistor 32 to dampen the needle response. Resistors 33 are a matched pair. Potentiometer 34 must have a range greater than that of the soil moisture resistance being measured. Normally-off switch 37 is depressed when taking readings. As this is being done, potentiometer 34 is rotated until meter 31 indicates a null.

An irrigation system is an excellant application for a typical System A operation. Here, the number of Sensing Rod assemblies, FIG. 1, and their discrete locations is a farming decision but only one portable Metering assembly, FIG. 4, is needed. Ground internment of the Sensing Rod would proceed in accordance with normal practice. Care must be observed so that good contact is made between the soil and the sensor electrodes. After installation, the soil in the immediate vicinity of the Sensing Rod should be tamped by foot. Some filling may be necessary after initial watering. The installation may be permanent or semi-permanent at the discretion of the farmer. Normally, polarization will be so minimal that switch 17 may be left in the "M" (meter) position. However, if de-polarization is desired switch 17 is set in the "S" (shorting bar) position. Each sensor electrode pair is then de-polarized by rotating knob 20 to each electrode pair for about 10 seconds. Switch 17 is then reset to the M position and measurements can proceed normally. Whether or not de-polarization is desired would be mainly a function of the soil/water chemistry and would be predetermined by test.

System B is comprised of the Station Monitor assembly, FIG. 7, and the Soil Moisture Sensor, FIG. 8. It is understood that FIG. 8 could be a plurality of sensors, one per station.

Referring to FIG. 7, the light intensity of station monitor lite bulb 35 is an indication of the state of the moisture at any pre-selected station. Dry and wet limits are indicated by the light intensities of lite bulbs 36 and 37, respectively. The light intensity of monitor bulb 35 will always fall between the light intensities of bulbs 36 and 37, assuming correct operation. Knob 38 controls station selection. The housing 39 is a plastic, or like material, box. Except for height, the embodiment of soil moisture sensor, FIG. 8, is the same a previously described for FIGS. 2 and 3. A preferred height is one-half inch. The sensor, FIG. 8, is coupled to the electronics in housing 39 by means of cabling 40.

Although the housing as shown in FIG. 7 can accomodate about 6 stations, no limitations are intended as to the number of stations. For example, consider an 18 hole golf course; the Station Monitor could have 54 monitoring lite bulbs (3 for each hole) in a console like structure. A caretaker, at a glance, could tell where and how much to water.

The electronics for System B, contained in housing 39, is shown by FIG. 9. Electrodes 13 are coupled from the common terminals of switch 15 to the base of transistor 41 by means of the network, capacitor 42 and resistor 43. Resistors 44, 45 and 46 constitute the biasing network for transistor 41. Capacitor 47, lite bulb 35 and potentiometer 48 comprise the transistor or circuit output. Potentiometer 48 is adjusted so that the light intensity of bulb 35 does not exceed the light intensity of wet lite bulb 37 limit for saturated soil moisture. Resistors 49 and 50 are selected to give the desired light intensities to dry and wet bulbs 36 and 37, respectively. The energy source for System B is house current, typically 117 volts A.C. Stepdown transformer 51 is used to provide the proper voltages for this circuit. Diodes 52, capacitor 53 and potentiometer 48 comprise the power supply rectifying and filtering network. This design permits continuous operation. However, an on-off switch can be inserted in the transformer primary side for operation only when desired.

While the preferred embodiment of my invention has been illustrated and described it will be understood that modifications and changes may be made within the scope of the claims hereto attached without departing from the spirit of the invention.

I claim:

1. In a system for determining the moisture content of soil wherein a soil moisture sensor is an electrical resistive component and where said sensor has a pair of spaced external electrodes in direct contact with the soil, a springlike means for maintaining a constant pressure relationship between each said electrode and the associated soil; said springlike means being a coherent assembly comprising each of said electrode, rubberlike matter and non-electrical conducting tubing; each said electrode being a flexible electrical conducting strip mounted in an annular arrangement on said tube; said mounting being so effected that there is an acute angled opening between each said electrode and said tube into which opening is wedged said rubberlike matter and so constituting the said springlike means.

2. In a soil moisture sensing system employing electrical resistivity principles and having a plurality of soil moisture sensors, a means for preventing electrical ground loops between said sensors; said means being effected by electrically isolating each electrode pair of each sensor from any other sensor electrode pair of said system; said electrical isolation being effected by the use of double-pole, multi-throw switching.

* * * * *